(12) United States Patent
Han

(10) Patent No.: US 9,434,232 B2
(45) Date of Patent: Sep. 6, 2016

(54) LIQUID CRYSTAL DISPLAY CAP OF AIR CONDITIONING CONTROL PANEL FOR VEHICLE

(71) Applicant: Sang Woo Han, Chungcheongnam-do (KR)

(72) Inventor: Sang Woo Han, Chungcheongnam-do (KR)

( * ) Notice: Subject to any disclaimer, the term of this patent is extended or adjusted under 35 U.S.C. 154(b) by 0 days.

(21) Appl. No.: 14/539,066

(22) Filed: Nov. 12, 2014

(65) Prior Publication Data

US 2016/0114647 A1 Apr. 28, 2016

(30) Foreign Application Priority Data

Oct. 23, 2014 (KR) .................. 10-2014-0144206

(51) Int. Cl.
*H04B 1/40* (2015.01)
*B60H 1/00* (2006.01)
*G02F 1/13* (2006.01)

(52) U.S. Cl.
CPC ........... *B60H 1/0065* (2013.01); *G02F 1/1313* (2013.01)

(58) Field of Classification Search
CPC .. B60H 1/0065; G02F 1/1313; G02F 1/1326

USPC .............................. 200/316; 349/58, 62, 64
See application file for complete search history.

(56) References Cited

U.S. PATENT DOCUMENTS

| 5,166,815 A | * | 11/1992 | Elderfield | ............ | G02B 6/0055 |
| | | | | | 349/58 |
| 7,812,274 B2 | * | 10/2010 | Dupont | .................. | B60K 26/02 |
| | | | | | 200/316 |

* cited by examiner

*Primary Examiner* — Tracie Y Green
(74) *Attorney, Agent, or Firm* — Norris McLaughlin & Marcus, P.A.

(57) ABSTRACT

Disclosed herein is an LCD cap of an air conditioning control panel for a vehicle. A transparent dark finishing plate is provided and a coating cover is coupled to the finishing plate by insert injection molding. A display window is formed in a central portion of the coating cover so that a numeral of an LCD panel can be displayed through the display window, and an opaque coating layer is formed on a remaining portion of the coating cover other than the display window. Therefore, when the LCD panel is in operation, a character or numeral can be displayed to the outside through the display window. When the LCD panel is not in operation, the front surface of the LCD cap can be generally shown in black. Thereby, the marketability of the product can be enhanced, and the quality of the interior design of the vehicle can be improved.

1 Claim, 5 Drawing Sheets

LIQUID CRYSTAL DISPLAY CAP OF AIR CONDITIONING CONTROL PANEL FOR VEHICLE

BACKGROUND OF THE INVENTION

1. Field of the Invention

The present invention generally relates to LCD (liquid crystal display) caps of air conditioning control panels for vehicles. More particularly, the present invention relates to an LCD cap of an air conditioning control panel for a vehicle in which a transparent dark-colored finishing plate is provided and a coating cover is coupled to a front surface of the finishing plate by insert injection molding, wherein a display window is formed in a central portion of the coating cover so that a character or numeral of an LCD panel can be displayed to the outside through the display window, and an opaque coating layer is formed on a remaining portion of the coating cover other than the display window. Therefore, when the LCD panel is in operation, a character or numeral can be displayed to the outside through the display window; and when the LCD panel is not in operation, the front surface of the LCD cap can be generally shown in black, whereby the marketability of the product can be enhanced, and the quality of the interior design of the vehicle can be improved.

2. Description of the Related Art

Generally, air conditioning control panels are provided ahead of front seats of vehicles so that users can control air conditioning installed in the vehicles through simple manipulation.

FIG. 1 is a view showing an air conditioning control panel provided with a conventional LCD cap 100. FIGS. 2A and 2B show the conventional LCD cap 10.

The air conditioning control panel has control buttons for selecting a variety of control modules pertaining to, for example, on/off operation of an air conditioning, an air conditioning position, an air supply direction, interior air circulation, outside air supply, etc. Furthermore, a knob unit for use in controlling the temperature of supply air is rotatably installed on the control panel.

An LCD panel for outputting information about the temperature varying depending on the angle at which the knob unit rotates to the left or the right is installed in the knob unit. An LCD cap is coupled to a front end of the knob unit so that number information output from the LCD panel can be displayed to the outside through the LCD cap.

As shown in FIG. 1, the LCD cap 100 includes a finishing plate 110 made of opaque resin (generally, opaque black-colored resin), and a transparent plate 120 that is made of transparent resin and is formed on a front surface of the finishing plate 110 by double injection molding. A display hole 111 is formed in a central portion of the finishing plate 110 so that number information output from the LCD panel 130 is displayed to the outside through the display hole 111.

A transparent plate 120 made of transparent resin is formed on the front surface of the finishing plate 110. The transparent plate 120 functions to protect the LCD panel 130. Numerals output from the LCD panel 130 are displayed to the outside through the display hole 111 and the transparent plate 120.

As such, the conventional technique is configured such that: the display hole 111 having an approximately rectangular shape is formed in the central portion of the finishing plate 110 made of opaque resin; and the transparent plate 120 made of transparent material is coupled to the front end of the finishing plate 110. However, regardless of whether the air conditioning is in operation, the rectangular display hole 111 is always shown to the outside through the central portion of the LCD cap that is exposed to the outside, and the black perimeter portion formed around the display hole 111 is also always shown to the outside. Therefore, the general appearance of the LCD cap is deteriorated. Particularly, in the daytime, a color difference between the black perimeter portion and the display hole 111 having a brighter color than that of the black perimeter portion is clearly shown. Thereby, the appearance of the product is further deteriorated.

SUMMARY OF THE INVENTION

Accordingly, the present invention has been made keeping in mind the above problems occurring in the prior art, and an object of the present invention is to provide an LCD cap of an air conditioning control panel for a vehicle in which a transparent dark-colored finishing plate is provided and a coating cover is coupled to a front surface of the finishing plate by insert injection molding, wherein a display window is formed in a central portion of the coating cover so that a numeral of an LCD panel can be displayed to the outside through the display window, and an opaque coating layer is formed on a remaining portion of the coating cover other than the display window. Therefore, when the LCD panel is in operation, a character or numeral can be displayed to the outside through the display window; and when the LCD panel is not in operation, the front surface of the LCD cap can be generally shown in black, whereby the marketability of the product can be enhanced, and the quality of the interior design of the vehicle can be improved.

In order to accomplish the above object, the present invention provides an LCD cap of an air conditioning control panel for a vehicle, the LCD cap being provided above an LCD panel installed in a knob unit and including: a finishing plate made of transparent material and having a dark color so that the finishing plate is visually shown in black, the finishing plate being coupled to a front end of the knob unit; and a coating cover coupled to a front surface of the finishing plate by insert injection molding, the coating cover having a transparent plate having a disk-shape, with a display window formed in a central portion of the transparent plate so that a numeral of the LCD panel is exposed to an outside, and an opaque coating layer formed by applying opaque paint to a portion of a rear surface of the transparent plate other than the display window. When the LCD cap is shown from the outside: the dark color of the finishing plate is shown to the outside through the display window while the LCD panel is not in operation, so that an entirety of the coating cover is shown in black; and number information output from the LCD panel is shown to the outside through the finishing plate and the display window when the LCD panel is operation.

In an LCD cap of an air conditioning control panel for a vehicle according to the present invention, when an LCD panel is in operation, a character or numeral can be displayed to the outside through a display window; and when the LCD panel is not in operation, the front surface of the LCD cap is generally shown in black. Therefore, the marketability of the product can be enhanced, and the quality of the interior design of the vehicle can be improved.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
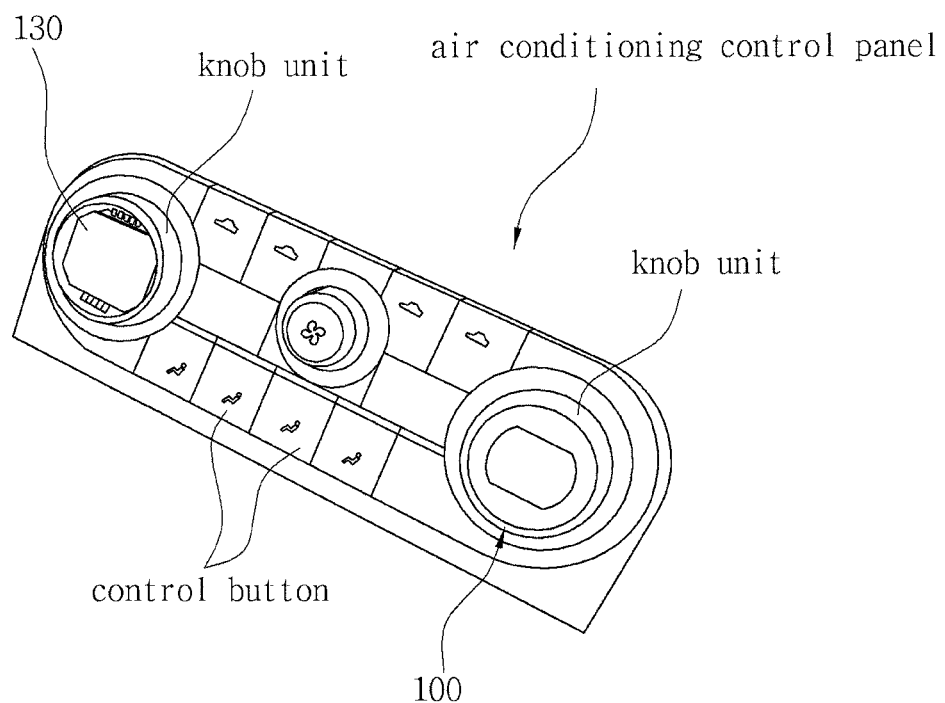
FIG. 1 is a view showing an air conditioning control panel provided with a conventional LCD cap.
Figure 2A:
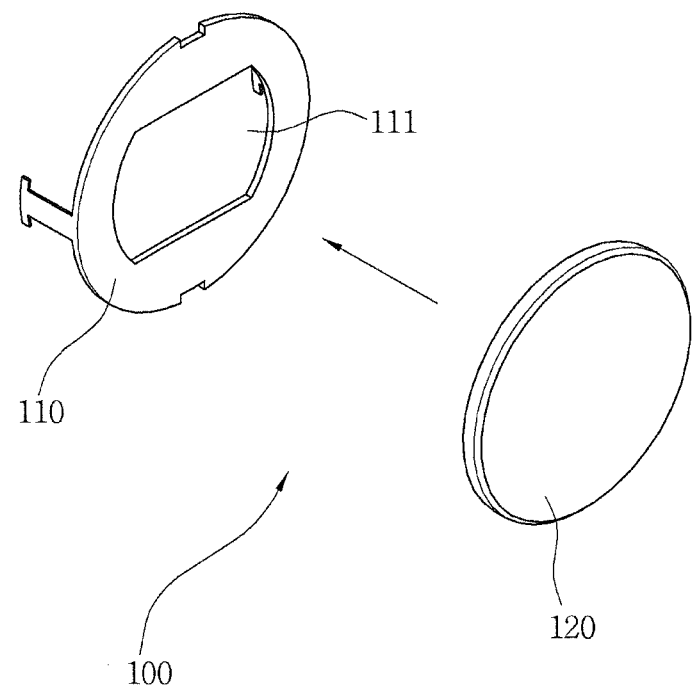
FIGS. 2A and 2B show the conventional LCD cap.
Figure 2B:
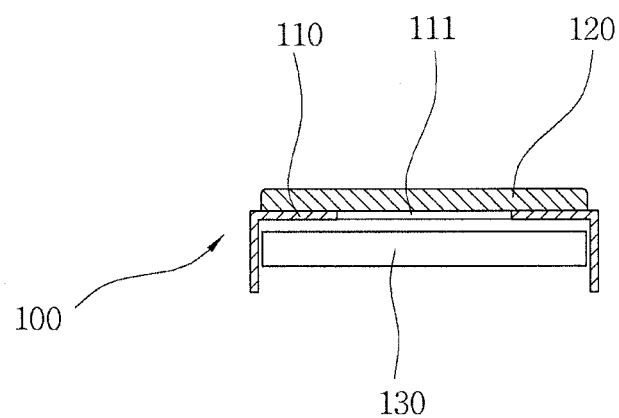
Figure 3:
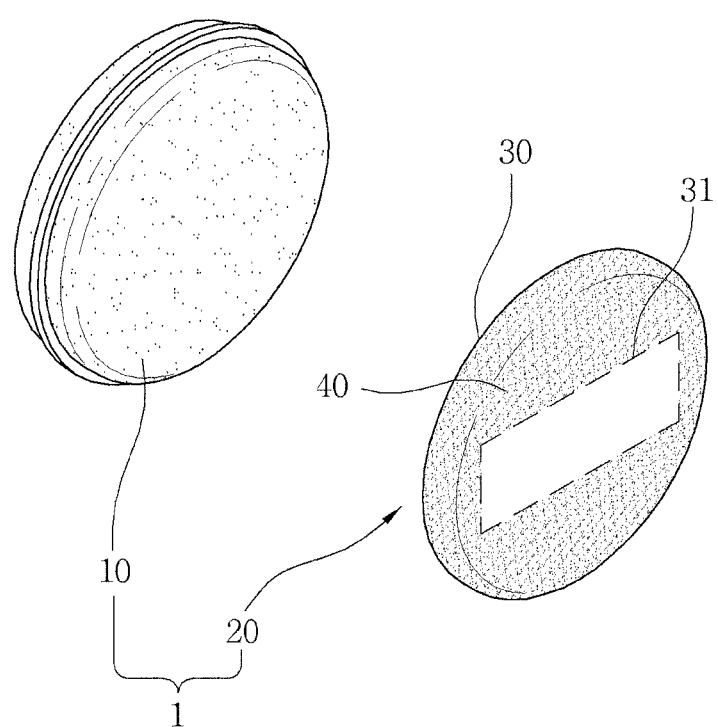
FIG. 3 is an exploded perspective view illustrating an LCD cap of an air conditioning control panel for vehicles according to an embodiment of the present invention.

Hereinafter, a preferred embodiment of the present invention will be described in detail with reference to FIGS. 3 through 5.

The present invention provides an LCD cap 1 that is treated by black-coating and is coupled to a front surface of a knob unit in which an LCD panel 60 displays a numeral digitally representing the position of an analog controller. By virtue of the black LCD cap 1, the marketability of a product can be enhanced and the quality of the interior design of the vehicle can be improved.

The LCD cap 1 includes: a cylindrical finishing plate 10 that is closed on a front surface thereof and is coupled to a front surface of the knob unit that is open on a front surface thereof; a disk-shaped transparent plate 30 made of transparent resin; and an opaque coating layer 40 formed on a rear surface of the transparent plate 30.

The finishing plate 10 is made of PC (polycarbonate) or ABS (acrylonitrile-butadiene-stryrene resin), which is transparent material. The finishing plate 10 generally has a dark color.

The term 'dark color' refers to all dark colors including black, dark blue, dark brown, etc. rather than referring to only black.

If the finishing plate 10 is made of a dark transparent material, light emitted from the LCD panel 60 disposed below the finishing plate 10 can pass to the outside through the finishing plate 10; but it looks black when no light is emitted form the LCD panel 60.

The transparent plate 30 is made of PC (polycarbonate) or PET (polyethylene terephthalate) material.

A coating cover 20 is provided by forming the opaque coating layer 40 on the rear surface of the transparent plate 30 allowing light to be emitted to the outside. The opaque coating layer 40 is formed by applying a coating solution mixed with black paint to the rear surface of the transparent plate 30.

Here, a separate shield film is attached to the rear surface of the transparent plate 30 before the dark-colored coating solution is applied to the transparent plate 30 to form the opaque coating layer 40. Then, the opaque coating layer 40 is formed on an area other than the portion of the transparent plate 30 to which the shield film is attached. After the opaque coating layer 40 is formed, the shield film is removed from the transparent plate 30 so that a transparent display window 31 is formed in a central portion of the transparent plate 30.

The coating cover 20 having the above-mentioned construction is coupled to the circular dark-colored finishing plate 10 by insert-injection molding, thus forming the LCD cap 1.

Figure 5:
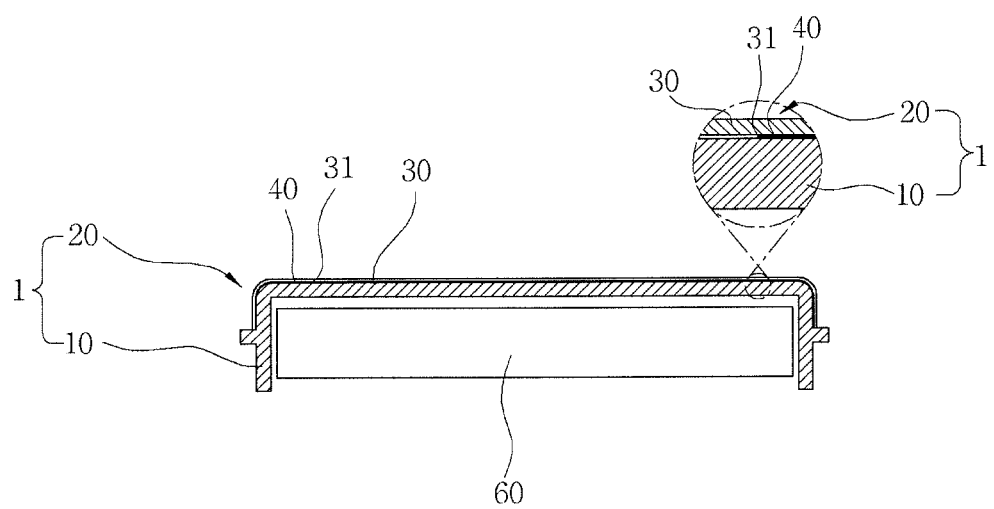
FIG. 5 is a sectional view of the assembled LCD cap according to the present invention.

As shown in FIG. 5, the LCD cap 1 formed by coupling the coating cover 20 provided with the display window 31 to the dark-colored finishing plate 10 is coupled to the knob unit in such a way that the LCD panel 60 is disposed inside the LCD cap 1. Then, light generated from the LCD panel 60 is emitted to the outside through the display window 31 formed in the LCD cap 1.

When the LCD panel 60 is not in operation, the dark color of the finishing plate 10 is shown to the outside through the display window 31 so that the entirety of the coating cover 20 is viewed in black. When the LCD panel 60 is in operation, number information output from the LCD panel 60 is shown to the outside through the display window 31. In this way, the quality of the interior design of the vehicle can be improved.

The preferred forming and installation process and effects of the present invention will be explained below.

The disk-shaped transparent plate 30 made of resin is provided. The display window 31 is formed in the central portion of the transparent plate 30. The opaque coating layer 40 is formed on a desired portion of the rear surface of the transparent plate 30 by applying black paint to the desired portion of the rear surface of the transparent plate 30 other than the central portion of the transparent plate.

Thereafter, the transparent dark-colored finishing plate 10 is formed.

Figure 4:
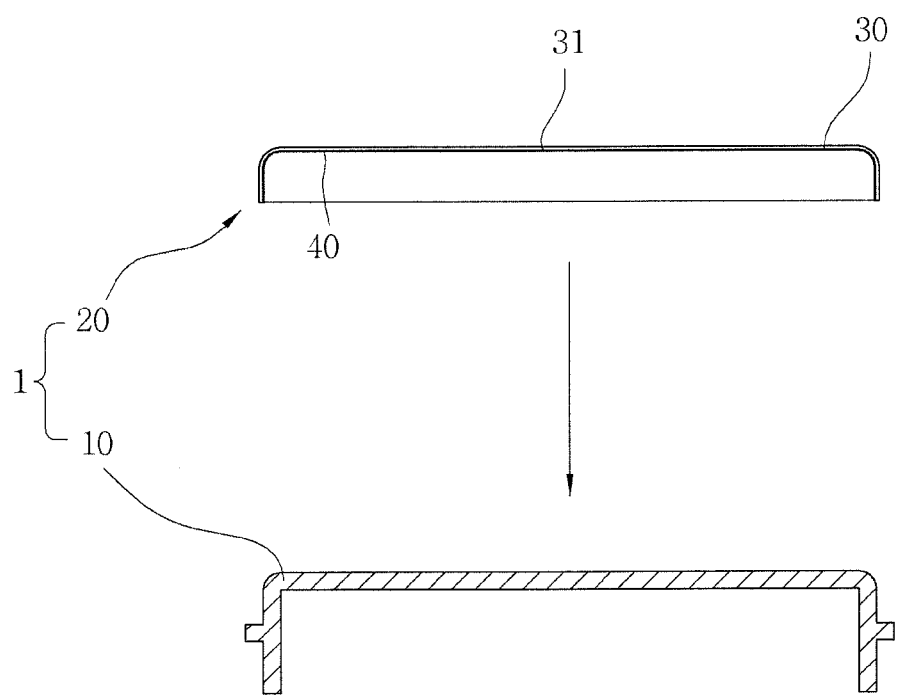
FIG. 4 is an exploded sectional view of the LCD cap according to the present invention.

As shown in FIG. 4, after the coating cover 20 formed by the above-mentioned method is placed on the front surface of the finishing plate 10, an insert injection molding process is conducted, thus forming the LCD cap 1, as shown in FIG. 5. Subsequently, the LCD cap 1 is coupled to the front surface of the knob unit installed around a driver seat of a vehicle.

The LCD cap 1 according to the present invention can improve the quality of the interior design of the vehicle because the LCD cap 1 appears black overall. In addition, digital numerals can be clearly displayed even in daytime and in bright light.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. An LCD (liquid crystal display) cap of an air conditioning control panel for a vehicle, the LCD cap being provided above an LCD panel installed in a knob unit and comprising:

a finishing plate made of transparent material and having a dark color so that the finishing plate is visually shown in black, the finishing plate being coupled to a front end of the knob unit; and a coating cover coupled to a front surface of the finishing plate by insert injection molding, the coating cover comprising: a transparent plate having a disk-shape, with a display window formed in a central portion of the transparent plate so that a numeral of the LCD panel is exposed to an outside; and an opaque coating layer formed by applying opaque paint to a portion of a rear surface of the transparent plate other than the display window, wherein when the LCD cap is shown from the outside: the dark color of the finishing plate is shown to the outside through the display window while the LCD panel is not in operation, so that an entirety of the coating cover is shown in black; and number information output from the LCD panel is shown to the outside through the finishing plate and the display window when the LCD panel is operation.

* * * * *